Dec. 13, 1960 G. E. HALL, JR 2,964,382
PRODUCTION OF PRECIPITATED CALCIUM CARBONATE
Filed April 4, 1958 2 Sheets-Sheet 1

INVENTOR.
George E. Hall, Jr.
BY George H. Hopkins
ATTORNEY

Dec. 13, 1960   G. E. HALL, JR   2,964,382
PRODUCTION OF PRECIPITATED CALCIUM CARBONATE
Filed April 4, 1958   2 Sheets-Sheet 2

INVENTOR
George E. Hall, Jr.
BY *George H. Hopkins*
ATTORNEY

United States Patent Office 2,964,382
Patented Dec. 13, 1960

2,964,382

PRODUCTION OF PRECIPITATED CALCIUM CARBONATE

George E. Hall, Jr., Wyandotte, Mich., assignor to Wyandotte Chemicals Corporation, Wyandotte, Mich., a corporation of Michigan Filed Apr. 4, 1958, Ser. No. 731,847

14 Claims. (Cl. 23—66)

This invention relates to a process for the production of precipitated calcium carbonate. More particularly, it relates to a process for producing precipitated calcium carbonate with improved properties.

This application is a continuation-in-part of my copending application S.N. 659,721, filed May 16, 1957, now abandoned, for "Production of Precipitated Calcium Carbonate."

Calcium carbonate in finely divided form is extensively employed in the arts for many purposes. For years, the paper industry has used calcium carbonate as a filler and as an essential ingredient in coatings to enhance the whiteness and brightness properties of the coated sheet as well as to add opacity thereto. Employed as a rubber reinforcing agent, calcium carbonate increases the tensile strength, tear resistance and other physical properties of rubber when used in an appropriate formulation and in appropriate amounts. In the cosmetic field calcium carbonate is used not only as a general base for face and body powders but as a filler or pigment in creams, lipsticks, ointments and skin preparations. It is an excellent polishing agent for high grade tooth powders and pastes. Large quantities are used as pigmenting materials in paints, enamels, lacquers, printing inks, and as a filler and pigment in linoleum and leather.

While calcium carbonate is found in nature as limestone, it is not directly suitable in its natural state for these uses because of the impurities contained therein and the difficulty in reducing the limestone particles to the desired size and shape. Consequently, it is the practice of the art to first calcine the limestone whereby carbon dioxide gas is driven off and any organic matter present is destroyed. The calcined material, referred to as quicklime, is then slaked with water whereby "crude" milk of lime is formed. Coarse aggregates and impurities are then removed as by classification procedures. The milk of lime (a suspension of finely divided calcium hydroxide) is then treated to precipitate calcium carbonate in a finely divided form.

This treatment in essence comprises contacting milk of lime with a carbonate ion contributing material, such as carbon dioxide or sodium carbonate and the like, whereby calcium carbonate is formed. By establishing the pH of the aqueous phase at a pH of at least 8.5 the solubility of calcium carbonate is so low that it is precipitated.

Currently, there are three commercial processes for performing this treatment.

One such process, known as the "carbonation" process, comprises bubbling carbon dioxide gas (which might be that driven off during the calcination step) through the milk of lime. Carbon dioxide dissolves in the liquid to contribute the carbonate ion. Since milk of lime comprises a saturated solution of calcium hydroxide, which has a pH of about 12, calcium carbonate is formed and precipitates.

Another such process, known as the "lime-soda" or "causticization" process, comprises the addition of a sodium carbonate solution to the milk of lime whereby insoluble calcium carbonate and soluble caustic soda are formed.

The third such process, which is disclosed in U.S. patents, Nos. 2,295,291 and 2,182,096—Roderick, and which is referred to herein as the calcium chloride process, involves the reaction of milk of lime with ammonium chloride to form a solution of calcium chloride and ammonium hydroxide. The solution is then heated whereby the ammonium hydroxide decomposes into water and ammonia, and the ammonia is driven off from the solution as a gas. Residual solid impurities which do not react in the solution are usually removed as by conventional settling procedures. The solution of calcium chloride is then contacted with a solution of sodium carbonate (preferably also free of solids) whereby calcium carbonate is precipitated and sodium chloride is formed.

In each of these processes the precipitated calcium carbonate is separated from the mother liquor, washed to remove reaction by-products and unreacted reactants, and then dried. Because of the tendency of the product to agglomerate during the drying step, the dried product may then be subjected to a light crushing operation to disintegrate the agglomerates.

In the development of these processes, it has long been recognized that the ultimate particle size of precipitated calcium carbonate controls many of the desired properties of this chemical compound, especially in its end uses. Thus, as a general proposition, the finer the particle size of the calcium carbonate the higher the gloss of the paper coating in which the calcium carbonate is used.

Consequently the art has concentrated a great deal of effort in working out refinements on these basic commercial processes to obtain and control a desired fineness of particle size.

Thus, the art has explored reaction conditions such as pH, temperature, reactant concentrations, reactant ratios and rates of addition. Variation in chemical composition of the reactants has also been tried and variations in the manner of contacting have been disclosed.

For example, one line of attack which the prior art has taken is exemplified by U.S. Patent, No. 2,081,112 (Statham et al.) wherein the carbonation process is utilized. In brief, the approach here is to agitate the surface of a pool of milk of lime to such a degree that the slurry is dispersed above the pool in the form of a fine mist. The atmosphere above said pool is saturated with carbon dioxide gas, so that the mist droplets of milk of lime react with the carbon dioxide to form solid calcium carbonate particles which fall back to the pool. Such a process presupposes that a mist of milk of lime can be formed and that each mist particle is equivalent to a particle of calcium carbonate.

Another approach to the problem is that exemplified by U.S. Patent, No. 2,080,616 (Lynn et al.) which teaches contacting under pressure in a mixing device a solution of $CaCl_2$ and a solution of $Na_2CO_3$ with the pH of the mixture established and maintained in a range from about 9.5 to about 11.5. The reactants are contacted in a single pass through the mixing device of Lynn et al. and, as a result of chemical reaction and subsequent precipitation of calcium carbonate, the admixture is discharged from the Lynn et al. mixing device in the form of a jelly-like rod which is led into a suitable mixing vessel and rapidly agitated for a few minutes whereupon the mixture becomes more fluid, resembling mucilage in appearance.

Still another approach to the problem is that exemplified by U.S. Patent, No. 2,140,375 (Allan et al.) which involves the causticization process. In this approach, a milk of lime slurry is prepared in which the suspended solids (calcium hydroxide particles) are of minus 300 mesh size. The slurry is treated with an excess of sodium carbonate, the addition of the soda ash to the slurry being rapid and with vigorous agitation. This patent discloses that the more vigorous the agitation the finer the particle size of calcium carbonate that is precipitated and the lesser the tendency of the crystals to grow in water suspension. A similar teaching is also found in U.S. Patent, No. 2,182,096 (Roderick) and U.S. Patent, No. 2,295,291 (Roderick), which pertain to the calcium chloride process.

It is known in the art that in each of the three commercial processes calcium carbonate will precipitate in the form of a gel upon contacting of the reactants. Although Allan et al. suggest that more vigorous agitation will prevent the formation of the actual gel structure in the reaction mixture, this reference specifically declares in the specification, on page 2, in column 2 at lines 33–36, that the calcium carbonate is essentially of the same quality as if the gel were allowed to form under more moderate agitation.

Thus, in spite of these and other advancements in the precipitation step of the various processes, there seems to be an upper limit on the properties of precipitated calcium carbonate, which the art has not been able to surpass by the mere change and refinement of the chemical and physical conditions of the precipitation step alone.

As a result of my investigations and observations, I have concluded that a major reason for this upper limit is that during and immediately after precipitation, a substantial proportion of the individual or simple crystals of calcium carbonate, regardless of their size and shape, are attracted to one another and form composites. Moreover, this compositing phenomenon occurs regardless of whether the precipitation takes place under agitation conditions such that a gel is formed or under more vigorous agitation conditions where a gel is not permitted to form. It is clear, therefore, that the vigorous agitation during precipitation suggested by Allan et al. and by Roderick is not sufficient to prevent the compositing effect. Stated another way, something more than the forces involved in vigorous agitation is required to surpass the limitations of the prior art.

These conclusions apparently have also been reached by workers in the prior art and there has been some development of post-precipitation treatments to reduce the composites to the ultimate particles.

Grinding of the dried solids has been tried. However, the extreme milling conditions used to comminute the composites yield particles comprising a substantial quantity of crystal fragments and fragments of crystal composites, which fragments present irregular surfaces and shapes, that adversely affect paper coating gloss value and other use properties.

Another approach along the lines of post-precipitation treatment is exemplified by the patents to H. R. Rafton, U.S. Patent No. 2,447,532 and 2,451,448 which teach subjecting the slurry of precipitated calcium carbonate from the precipitation step to attrition, grinding and the like before removing the water and drying the solids. However, the particles of calcium carbonate so obtained likewise comprise a substantial quantity of crystal fragments and fragments of composites with irregular surfaces and shapes. Moreover, this approach requires appropriate grinding or attrition equipment in addition to the calcium carbonate precipitation equipment, the usual drying equipment and the usual crushing mills following the drying equipment.

The latest development in the post-precipitation treatment approach of which I am aware is disclosed in the article entitled "Aqueous Dispersions of Calcium Carbonate," by Leaf and Liggett, in Tappi, vol. 39, No. 3, March 1956 (at pages 142–147). This article teaches stirring very high-solids dilatent slurries of the precipitated calcium carbonate until a marked decrease in viscosity occurs. By so doing, composites are broken down. However, there still appears a substantial proportion of composites and even though they may be smaller in size, there is still room for further improvement.

In any event, the post-precipitation treatment approach is handicapped in that composites of calcium carbonate, when once formed, are extremely difficult to dissociate into the ultimate crystals.

Before proceeding further, it should be mentioned that I draw a distinction between agglomerates, aggregates and composites. While each of these classes of particle masses may be obtained through the phenomenon of flocculation and thus form a basis for interchangeable use of terms without distinction, nevertheless, in light of Webster's New International Dictionary (second edition—unabridged) and in view of my observations, a distinction does exist. Thus, as used in this application, the word "composite" denotes a very closely-knit mass of ultimate particles, which is extremely difficult to disintegrate into the ultimate particle (the "aggregates" of the Leaf et al. article are actually "composites" under this definition); "agglomerate" denotes a very loosely-knit mass of ultimate particles, which is quite easy to disintegrate into the ultimate particle (I also use it herein to denote a very loose-knit mass of composites, which is quite easy to disintegrate into the composites); while "aggregate" denotes a mass of particles, which is intermediate the two extremes in ease of disintegration.

It is therefore an object of this invention to develop ways and means for preparing precipitated calcium carbonate under such conditions that the individual calcium carbonate crystals upon precipitation are established and maintained in a noncomposited state.

A more general object is to prepare a precipitated calcium carbonate having properties heretofore unobtained. Still another object is to develop a practical process for preparing such a precipitated calcium carbonate.

More particularly, it is a specific object of this invention to develop ways and means for precipitating finely divided calcium carbonate in a field of forces of such a type and of sufficient intensity and magnitude to establish and maintain the individual crystals of calcium carbonate in a completely segregated condition.

These and other objects of this invention which may be developed as the specification proceeds are achieved by this invention.

In summary, this invention comprises establishing and maintaining in a liquid medium a field of anti-compositing forces and gradually precipitating calcium carbonate in that liquid medium. In other words, it is a basic concept of this invention that calcium carbonate in passing from a solution phase to a solid phase in a liquid medium be subjected to anti-compositing forces of sufficient magnitude and intensity to establish and maintain each crystal thereof in a discrete, segregated condition.

In short, to obtain precipitated calcium carbonate with the desired properties, it is not only necessary to obtain a high degree of dispersion of the reactants and thus produce a prodigious quantity of crystal nuclei as taught by the Allan et al. patent, so as to minimize crystal growth and thus control crystal size, but, in addition, I have found that it is just as essential that each of the crystals be gradually formed from said nuclei and upon formation be continuously subjected to anti-compositing forces of sufficient intensity and magnitude to establish and maintain them in a segregated condition during and after their formation until their tendency to composite has substantially disappeared.

Broadly then, this invention comprises gradually contacting calcium ions with carbonate ions in an aqueous medium at a pH established and maintained at least at 8.5, whereby calcium carbonate is formed and gradually precipitated in the form of crystals, while continuously subjecting said solution and precipitated crystals of calcium carbonate, until precipitation has substantially ended, to anti-compositing forces of sufficient intensity and magnitude to establish and maintain substantially all of said crystals in a completely seggregated condition.

The concept of this invention is applicable to each of the three commercial processes previously mentioned herein.

Thus, in the "carbonation" process this concept is applied as follows. Milk of lime slurry at a pH of over 8.5 is charged into a reaction zone subjected to anti-compositing forces and carbon dioxide gas is gradually and intimately dispersed with the aid of these forces into the slurry in the zone. Carbon dioxide dissolves in the slurry, forming thereby carbonate ions which contact the calcium ions in the aqueous medium and combine to form calcium carbonate which, being very insoluble under the reaction conditions, precipitates in the form of tiny crystals.

To produce a calcium carbonate suitable for paper coatings the reaction slurry temperature should be established and maintained in the range from about 25° C. to about 60° C. Crystals produced in this temperature range appear under the electron microscope to be acicular in shape and calcitic in crystal structure. To produce a "rubber grade" calcium carbonate the temperature of the reaction slurry should be below about 25° C., the practical minimum temperature being −10° C. Under the electron microscope crystals of calcium carbonate produced in this range (−10° C. to about 25° C.) appear to be cubical in shape and calcitic in structure. Above a reaction slurry temperature of 60° C. the crystals produced appear under the electron microscope to be needle-like in shape and aragonite in structure. While such a structure gives an adverse flow property effect to slurries of said crystals, nevertheless, calcium carbonate with this type of crystal structure is useful as a paper filler.

The milk of lime in the "carbonation" process should have a CaO concentration in a range, the lower limit of which is set only by the practical economics of the system while the upper limit is dependent only on that concentration of precipitated calcium carbonate at which the resulting reaction slurry becomes solid. In general, this range is from about 54 grams per liter to about 154 grams per liter.

The calcium carbonate slurry, after precipitation is complete, is removed from the reaction zone, filtered, for example, washed to remove a substantial portion of residual, unreacted milk of lime, and then dried. Because some of the crystals may tend to agglomerate during the drying procedure, the dried product is lightly crushed. However, the product is soft and amorphous, and the agglomerates readily disintegrate into the individual crystals of calcium carbonate of the same size, shape, and structure as obtained in the reaction zone and without a substantial fracturing of the crystals.

The application of this concept to the calcium chloride process is as follows. Calcium chloride solution (such as ammonia still "waste" or DBO liquor), preferably in stoichiometric excess (see Roderick 2,182,096), and sodium carbonate solution (such as Decomposer or DO liquor which usually comprises $NaHCO_3$ and which may have been partially neutralized with caustic) are contacted in a reaction zone subjected to intense anti-compositing forces.

The contacting is accomplished by the gradual addition of one solution to the other, preferably adding the sodium carbonate solution to the calcium chloride solution since a reverse addition results in a slow reaction and loss of control of precipitation. For batch-wise operation the minimum addition time of one solution to the other has been determined to be about ninety seconds while the optimum addition time is about 120 seconds.

The pH of the mixture should always be at least 8.5 and preferably in excess thereof, and for a paper coating grade product the precipitation should preferably take place at a temperature in the range of about 25° C. to about 60° C.

Calcium ions and carbonate ions combine to form calcium carbonate which, being very insoluble under the reaction conditions, precipitates in the form of microscopic crystals which, when contacting occurs in the just stated temperature range, appear under the electron microscope to be cubical in shape and calcitic in crystal structure. The anti-compositing forces are of sufficient magnitude to establish and maintain the individual crystals in a discrete condition. The resulting calcium carbonate slurry, after reaction and precipitation are complete, is removed from the reaction zone, washed to an essentially salt-free condition, dried and then crushed.

The anti-compositing forces in the reaction zone, regardless of which precipitation process is employed, must be of sufficient intensity and magnitude to establish and maintain each crystal of precipitated calcium carbonate completely segregated from its neighboring particles throughout the reaction zone. Such forces not only include those forces usually associated with agitation, mixing and blending but also other forces which have not as yet been defined. Consequently, the anti-compositing forces of this invention are described herein only in terms of one apparatus found capable of producing them.

Such an apparatus is disclosed and described in U.S. Patent, No. 2,619,330 (P. Willems), granted November 25, 1952. In brief, this apparatus comprises two parallel and relatively rotatable discs, two shafts, the discs forming a central chamber between them and being centrally secured to the shafts, one of the shafts being tubular and having arranged within, and serving as a bearing for, the other shaft, a centrifugal pump arranged in said chamber and including propeller blades extending substantially radially and carried by one of the shafts, the propeller blades terminating at a distance from the circumferences of the discs, the discs being provided on their inner faces outside the centrifugal pump area with spaced concentric rows of spacedly and circularly arranged teeth, the teeth of either disc between the teeth of the outermost and innermost rows projecting into the spaces between adjacent rows of teeth of the other disc, the teeth being shaped and arranged to form material-impacting flanks extending generally radially, the spaces between the teeth of the outermost row forming material discharge openings around the entire periphery of the device.

To develop anti-compositing forces of the requisite intensity and magnitude, the differential peripheral speed between the inner circumferential periphery of the outer disc and the adjacent outer circumferential periphery of the inner disc must be at least about 1160 feet per minute. Below this speed the reaction slurry goes through a gel formation stage wherein compositing occurs. From a theoretical point of view there is no upper limit on the differential peripheral speed. The highest speed so far obtained by me is 7800 feet per minute. From a practical point of view, considering power costs, the economics of the situation will control the top limit of speed.

In order to continuously subject the reactants and precipitated calcium carbonate to the anti-compositing forces of requisite intensity and magnitude, the reaction zone (or reactor) should comprise a cylindrical tank, the inside diameter of which bears a maximum ratio to the outside diameter of the inner disc of about 6:1. On a batch basis the discs should be submerged in the tank contents to a depth such that when precipitation is ended the depth to which the discs are then submerged (which is the depth for a continuous process) will be at least ⅓ of the depth of the tank contents.

The ratio of the pumping rate (gallons per minute) of the centrifugal pump to the volume of the tank contents should be at least 3:1. There is no upper limit on this ratio except that which may be imposed by economic considerations.

It is preferred that the reactor tank have an arcuate bottom in order to prevent swirling of the tank contents and the formation of "dead" areas in the tank contents during the application of anti-compositing forces and thereby to assure the continuous passage of reactants and slurry of calcium carbonate crystals through the discs. A tank with a flat bottom can be used but, in such case, it is preferred that vertical baffles be disposed along the sides of the tank and a stationary horizontal baffle be provided adjacent the outer shaft of the apparatus at the operative liquid level in the tank to block swirling.

It should also be mentioned that anti-compositing forces of the requisite intensity and magnitude have been developed by an apparatus of the type found in U.S. patent, No. 2,109,501. However, this apparatus has been adapted so far only to laboratory scale operations and is not practical for commercial scale operations.

It is important that the anti-compositing forces of the requisite intensity and magnitude be continuously applied from the very commencement of precipitation of calcium carbonate until precipitation is complete, because I have found that once compositing has occurred, as evidenced by gel formation, the composited crystals cannot be dissociated under the influence of the anti-compositing forces of said intensity and magnitude. In other words, the objects of this invention cannot be achieved by first contacting the reactants and precipitating calcium carbonate under at most the influence of vigorous agitation and then by subjecting the resultant slurry or gel to anti-compositing forces.

As a corollary it is necessary that the reactants and subsequent reaction process be in a fluid or pumpable state. Stated another way, the reactants and subsequent reactant mass must always be in the form of a fluid slurry.

The calcium carbonate produced in accordance with this invention has improved properties especially in paper coatings wherein these properties have led to substantial improvements in gloss values, while maintaining brightness and opacity with smaller quantities than heretofore used. This represents a significant advance in the art, particularly since no one else in the art, insofar as I am aware, has obtained, especially on a commercial scale, massive quantities of uncomposited or segregated crystals of calcium carbonate.

A feature of this invention is that the ultimate particle size of the calcium carbonate, which is the original crystal size, is now largely dependent on the chemical conditions of the precipitation system. Consequently, the basic concept of this invention is applicable in the production of calcium carbonate of any desired particle size, or particle size distribution in the micron ranges.

In its broader aspects, this invention is directed to precipitated chemical products, the particles of which tend to composite during their precipitation and it is a broad concept of this invention that said particles be precipitated gradually and as they precipitate they be continuously subjected, until precipitation has ended, to anti-compositing forces of sufficient intensity and magnitude to establish and maintain the particles in segregated condition.

Before turning to the drawings it should be understood that this invention may be embodied in several forms without departing from the spirit or essential characteristics thereof, and that the embodiments to be described are illustrative and not restrictive, as the scope of the invention is determined by the appended claims rather than by the description preceding them, and all changes that fall within the meaning and range of equivalents of the claims are therefore intended to be embraced thereby.

Turning now to the drawings, it will be observed that

Figure 1:
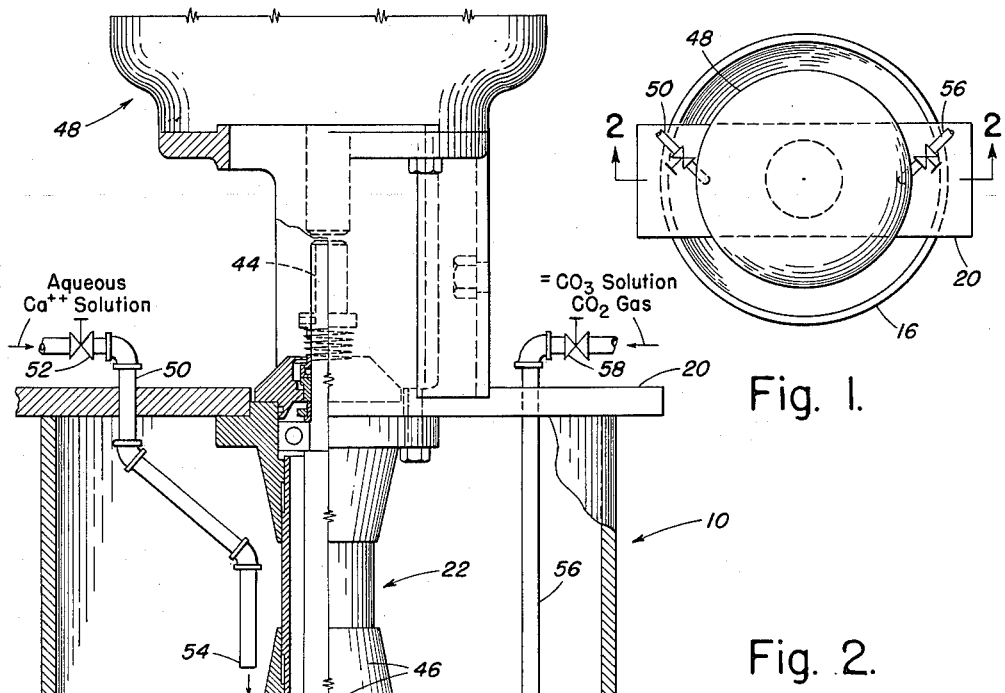
Fig. 1 is a plan view of a preferred reactor of this invention.

In somewhat greater detail, there is shown in the drawings a reactor 10 comprising an upright tank having an arcuate bottom 14, a cylindrical side 16, and supporting leg members 18. Disposed at the top of the tank is a platform 20 to which is bolted, and from which is suspended, an anti-compositing force producing apparatus 22.

The apparatus as shown is essentially that disclosed and claimed in U.S. Patent, No. 2,619,330, by Peter Willems. It comprises a head 24 having inlet openings 26 on the upper side thereof, an inlet opening 28 on the bottom and outlet openings 30 disposed about the outside periphery thereof. Said head 24 comprises a stationary annular disc 32 with an outer peripheral ring of downwardly extending teeth members 34 and an inner peripheral ring of downwardly extending teeth members 36 concentrically disposed and spacedly set apart from the outer peripheral ring of teeth members 34. Surrounding the bottom inlet opening 28 and disposed beneath the stationary annular disc 32 is a rotatable annular disc 38 having a peripheral ring of upwardly extending teeth members 40 positioned between the outer peripheral ring of teeth members 34 and the inner peripheral ring of teeth members 36 of the stationary annular disc 32. The ratio of the inside diameter D of the tank to the outside diameter of the rotatable disc 38 is less than 6:1, and in fact about 3:1. The discs together form a centrifugal pump chamber 41 the inlets to which are the bottom inlet opening 28 and the upper inlet openings 26. Pumping action is provided by pump blades or vanes 42 vertically disposed adjacent the inner peripheral ring of teeth members 36 and attached to a rotatable center shaft 44 to which the rotatable annular disc 38 is likewise connected. This shaft passes vertically through the shaft housing (an outer shaft) and bearing assembly 46 and into a gear box and motor housing 48 wherein power is supplied for the driving of the shaft and thus of the pump blades 42 and the rotatable annular disc 38.

The reactor 10 is provided with a calcium ion bearing solution conduit 50 having a shut-off and flow rate control valve 52. The outlet of the conduit 50, it will be observed, is disposed adjacent the normal operative liquid level of the reactor and adjacent the shaft housing 46 for the purpose of charging calcium ion bearing solution into the most direct path to the inlet openings 26 of the head 24 and obtaining thereby practically immediate dispersion.

The reactor 10 also comprises a carbonate ion bearing solution conduit 56 which also has a shut-off and flow rate control valve 58. The outlet of this conduit is a gas sparger 60 which comprises an annular conduit 62 lying in the horizontal plane directly below the mixing head 24 and provided with a series of evenly spaced orifices 64 on the upper side thereof, which are in communication by way of said conduit 62 with conduit 56. The position of the gas sparger orifices 64 is such that reactant passed therethrough is immediately pulled through the bottom inlet opening 28 of the head and intimately dispersed throughout the reactor contents.

The reactor tank is also provided with a slurry discharge conduit 68 which has a shut-off and flow rate control valve 69.

Under preferred conditions of operation, an aqueous reactant solution containing calcium ions is charged into the reactor tank through feed conduit 50 in sufficient quantity to cover the head 24 to a depth H', which in the carbonation process should be at least one-third the distance H from the surface of the liquid in the tank to the lowermost point of the arcuate bottom 14 and which, in those processes where the carbonate ion contributing reactant is in solution, should be sufficient to just submerge the head and, upon completion of the reaction and precipitation, to submerge the head to about one-third the reactor depth H.

The motor and drive arrangement within the gear box and motor housing assembly 48 is then actuated to give at least a peripheral speed to the inner rotatable annular disc 38 of about 1160 feet per minute. The ratio of the pumping rate of the head 24 in gallons per minute to the volume of the reactor tank contents (gallons) is at least 3:1.

Introduction at a significant rate through feed conduit 56 of a carbonate-contributing reactant such as a carbonate ion containing solution or carbon dioxide gas into the tank is then commenced and continued until a stoichiometric quantity of the reactant has been introduced into the tank. Said rate of introduction is selected to give gradual precipitation; it should not be large enough to result in gel formation. In the case of the carbonate ion containing solution, the rate of introduction under batch-wise operation conditions should be such that the time of addition is at least about ninety seconds and preferably about 120 seconds.

Figure 2:
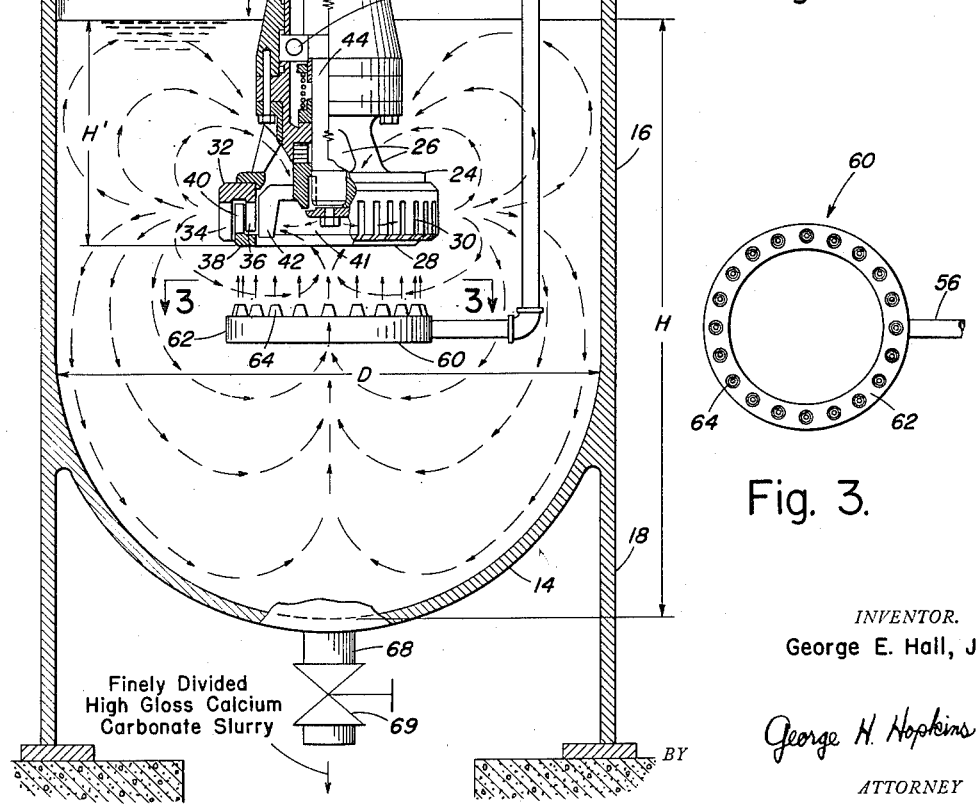
Fig. 2 is a cross-sectional view taken along the line 2—2 of the reactor of Fig. 1.
Figure 3:
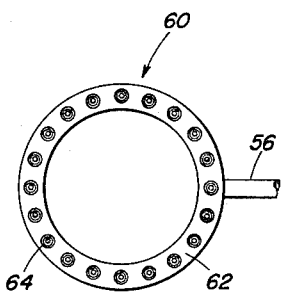
Fig. 3 is a plan view of the reactant distributing means shown in Fig. 2 and taken along the line 3—3 of Fig. 2.

Because of the pumping action and the anti-compositing forces being generated by the head 24, said other reactant, as it is being introduced into the tank, is intimately mixed and blended into the first reactant so that contact between calcium ions and carbonate ions is immediate. Precipitation of calcium carbonate in the form of microscopic crystals rapidly follows said contact and said crystals are established and maintained in a completely segregated condition by continuously passing them through said head 24, as indicated by the flow lines in Figure 2. It will be noted from the flow lines in Figure 2 that a helical-type flow pattern is imparted to the slurry in the aqueous precipitation zone.

When chemical reaction and precipitation have ended and the crystals of calcium carbonate no longer exhibit a tendency to composite, and it is desired to operate the reactor 10 on a continuous basis, the valves 52 and 58 associated with the respective reactant bearing conduits are opened and adjusted to obtain the desired flow rates of the reactant solutions into the tank and the control valve 69 on the slurry discharge conduit 68 is opened and adjusted to discharge reaction slurry at a rate sufficient to maintain the tank contents at the established height H.

Continuous operation of the reactor 10 has a disadvantage, however, in that reaction slurry withdrawn through the discharge conduit 68 may still be undergoing reaction and precipitation so that the end product will contain a small percentage of composited crystals of calcium carbonate. This may be tolerated in a few applications of the end product in view of the over-all reduction in percentage of composited crystals. For other applications of the end product, however, this would be objectionable, wherefore, generally speaking, it is preferred that the reactor be operated on a batch basis in order that the calcium carbonate slurry formed in the reactor be continuously subjected to anti-compositing forces until reaction and precipitation have ended.

In batch-wise operation, and in stopping continuous operation when chemical reaction and precipitation have ended and the crystals of calcium carbonate no longer exhibit a tendency to composite, the motor and drive arrangement in the housing assembly 48 is turned off and the discharge valve 69 is opened to discharge the reactor contents through conduit 68, to, for example, a holding tank, preceding filtration, washing, and drying operations.

To illustrate various features and conditions of this invention and to enable workers of ordinary skill in the art to duplicate the results of this invention the following examples are set forth.

EXAMPLE I

This example illustrates the preparation of precipitated calcium carbonate by the carbonation process according to the teachings of this invention.

Fifty liters of a classified milk of lime containing 112 g.p.l. CaO are introduced into a 15-gallon reactor of the type shown in the drawing, the tank (flat bottom) having a depth H of 35 inches and an inside diameter D of 14 inches. The head 24 of an anti-compositing force generating apparatus with an inner disc 38 which has a diameter of 4.6 inches, is submerged in the slurry to a depth H' which is ⅓ the slurry depth H. The inner disc is then rotated at a peripheral speed of 7800 feet per minute. The pumping ratio is at least 3:1. After heating the slurry to a temperature of 30° C., gas containing 40% by weight of $CO_2$ (100% $CO_2$ diluted with air) is introduced into the slurry through the gas sparger 60 disposed two to three inches below the head 24 and at a rate of 5 cubic feet per minute while maintaining the temperature of the slurry at 30° C.±5° C. The slurry is carbonated until the reaction to phenophthalin of slurry samples taken periodically is colorless and then for an additional 10 minutes to carbonate the residual lime content. The rotation of the inner disc 38 is then stopped and the calcium carbonate slurry is discharged from the reactor tank. After filtration, the crystals are dried at 105° C. to less than 2% by weight of moisture and then hammermilled.

Samples of the calcium carbonate prepared according to foregoing procedure gave the following results in comparison with a conventionally precipitated calcium carbonate prepared by the calcium carbonate process in all respects identical to the foregoing except that in place of the anti-compositing force generating apparatus there was used a 60° pitch, 10 blade, fan turbine agitator operated at a peripheral speed of approximately 2,300 feet per minute, the fan impeller being located at a height above the bottom of the reactor tank of about ¼ the height of the tank contents.

| | Calcium Carbonate Prepared According To Invention | Calcium Carbonate Prepared With Turbine Agitator |
|---|---|---|
| Packed Density, g./cc | 0.55 | 0.61 |
| Gloss (Procedure A): | | |
| (Hunter 75°) | 49 | 40 |
| (Ing. 60°) | 67 | 58 |

The preceding data were obtained in accordance with the procedures hereinafter set forth under the heading "Measurement procedures."

Figure 4:
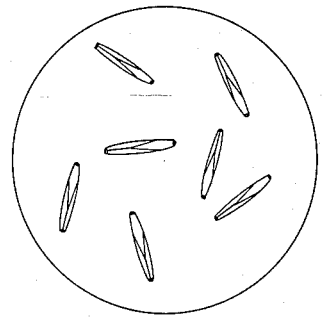
Fig. 4 is an electron microscope view of uncomposited crystals of calcium carbonate, that are acicular in shape and calcitic in structure.

Electron microscope photographs revealed that the calcium carbonate crystals prepared with the turbine agitator were composited while the crystals of calcium carbonate prepared according to this invention were acicular in shape and calcitic in structure as in Figure 4.

The gloss data demonstrate the advantage of having uncomposited crystals of calcium carbonate.

EXAMPLE II

This example illustrates the preparation of precipitated calcium carbonate by the calcium chloride process according to the teachings of this invention.

Seventy liters of a calcium chloride solution (112 g.p.l. $CaCl_2$) at 67° C. are added to a 40-gallon reactor tank (flat bottom) having a depth of 29 inches and an inside diameter of 22 inches. The head 24 of the anticompositing force producing apparatus 22 is positioned in the reactor tank so that it is submerged about one inch below the surface of the calcium chloride solution. The outside diameter of the inner disc 38 is 4.6 inches. Thirty liters of DO liquor (180 g.p.l. $Na_2CO_3$ and 50 g.p.l. $NaHCO_3$ at 53° C. are added within 120 seconds to the calcium chloride solution while the inner disc 38 of the head 24 is rotated at a peripheral velocity of about 7800 feet per minute. The pumping ratio is at least 3:1. The reaction slurry is subjected to the anti-compositing forces developed by the head 24 for a period of six minutes following the addition to make sure that belatedly precipitated crystals are kept segregated. The slurry is then filtered, washed substantially free of chloride ions, dried at 105° C. to less than 2% moisture and hammermilled.

Samples of calcium carbonate prepared in accordance with the foregoing procedure gave the following results in comparison with calcium carbonate prepared as in the foregoing except that in place of the anti-compositing force producing apparatus there was used a 60° pitch, 10 blade turbine agitator which turned at a peripheral speed of approximately 525 feet per minute. The fan impeller was located about 3–4 inches from the bottom of the reactor tank.

|  | Calcium Carbonate Prepared According To Invention | Calcium Carbonate Prepared With Turbine Agitator |
|---|---|---|
| 15 min., Settled Volume, 60 g.p.l. _____ ml__ | 980 | 945 |
| Packed Density _____ g./cc__ | 0.64 | 0.70 |
| Apparent Particle Size Distribution: |  |  |
| Greater than 10μ _____ percent__ | 1 | 4 |
| From 10μ to 6μ _____ do ____ | 2 | 6 |
| From 6μ to 4μ _____ do ____ | 3 | 16 |
| From 4μ to 2μ _____ do ____ | 16 | 48 |
| From 2μ to 1μ _____ do ____ | 38 | 19 |
| Less than 1μ _____ do ____ | 40 | 7 |
| Gloss (Procedure B): |  |  |
| (Hunter 75°) | 43.1 | 34.5 |
| (Ing. 60°) | 73.0 | 69.5 |

Figure 5:
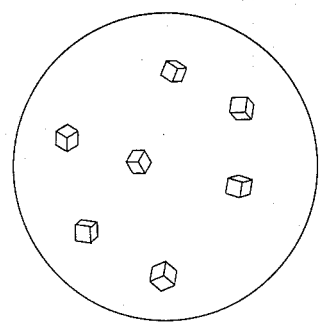
Fig. 5 is an electron microscope view of uncomposited crystals of calcium carbonate, that are cubical in shape and calcitic in structure.
Figure 6:
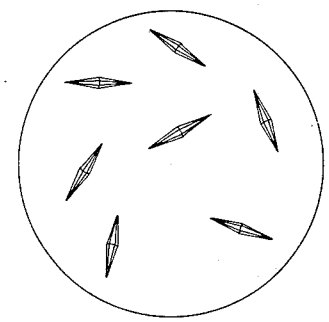
Fig. 6 is an electron microscope view of uncomposited crystals of calcium carbonate, that are aragonite in structure and needle-like in shape.

The foregoing data shows that the apparent particle size of calcium carbonate prepared according to the invention is much less than that of the calcium carbonate prepared with the turbine agitator. The gloss values indicate that the particles of the calcium carbonate prepared according to the invention are for the most part the ultimate particles or, to state it another way, the individual crystals of calcium carbonate, whereas the particles of the calcium carbonate prepared with the turbine agitator are for the most part composited crystals. Electron microscope photographs confirm the accuracy of these indications. Moreover these photographs show the non-composited crystals of calcium carbonate to be cubical in shape and calcitic in crystal structure as in Figure 5.

EXAMPLE III

This example illustrates the differences in properties of calcium carbonate prepared under gel-forming conditions and of calcium carbonate prepared in accordance with the teachings of this invention.

Gel formation method 4,018 pounds of a calcium chloride solution (110 g.p.l. $CaCl_2$) at 67° C. were added to a 3,000 gallon reactor tank (flat bottom) which has an inside diameter of 6½ feet and a depth of 8 feet. A 2.5 foot diameter, 60° pitch, 8-bladed fan turbine agitator was positioned in the tank so that it was 6 inches off the bottom. The speed of the agitator was set at 500 r.p.m. 1,630 pounds of DO liquor (180 g.p.l. $Na_2CO_3$, 50 g.p.l. $NaHCO_3$) at 53° C. were added within 70 seconds to the calcium chloride solution. Within 30 seconds, the reaction gelled almost to a solid mass. The gel broke within 70 seconds and the slurry was agitated for a total lapsed time of 6 minutes. The slurry was then filtered, washed substantially free of chloride ions, dried at 105° C. to less than 2% by weight of moisture and hammermilled.

Method of invention

The same reactants, quantities and concentrations, sequence and time of addition and the same reactor tank were used as in the preceding method. In place of the impeller an anticompositing force producing apparatus corresponding in all material aspects to that shown in the drawing was used. The outside diameter of the inner disc 38 was 13.8 inches. The head 24 of the apparatus was submerged in the calcium chloride solution to a depth which, after addition of the DO liquor, was judged to be about ⅓ the height of the solution in the reactor. The differential peripheral speed of the discs was 3680 feet per minute and the pumping ratio was judged to be at least 3:1. Upon addition of the DO liquor, reaction occurred without the formation of a gel. After 6 minutes of subjecting the reaction slurry to the anti-compositing force field developed by the head 24, the slurry was filtered, washed substantially free of chloride ions, dried at 105° C. and hammermilled.

From samples of the calcium carbonate prepared by the foregoing methods, coating colors were prepared which were formulated as follows: 25% by weight calcium carbonate, 60% by weight KCS clay and 15% by weight Spray Satin clay. To the basic formulation, in each case, there was added, as an adhesive, starch in the amount of 15% by weight of the basic formulation. The coating color in each case was then suspended in water in sufficient concentration to give a 63% by weight solids concentration. The coating color suspensions were than applied to a 40 pound base stock paper at varying coat weights on a laboratory paper coater. After coating, each of the papers was supercalendered at a pressure selected to give about an 80 to 82 Ingersol gloss to the 11 pound coat weight paper containing the calcium carbonate prepared by the gel forming method. Gloss and printability measurements were then made on the thus prepared papers and the following tabulated data were obtained:

| Coat Wt. | Papers Containing Calcium Carbonate Prepared By Gel-Forming Method | | | Papers Containing Calcium Carbonate Prepared By Method of Invention | | |
|---|---|---|---|---|---|---|
| | Gloss | | Printability | Gloss | | Printability |
| | (Ing. 60°) | (Hunter 75°) | | (Ing. 60°) | (Hunter 75°) | |
| 13 lbs. | 83.3 | 75.4 | 70 | 83.5 | 81.5 | 80 |
| 11 lbs. | 82.8 | 62.4 | 60 | 83.8 | 81.6 | 70 |
| 10 lbs. | 80.8 | 61.7 | 60 | 83.5 | 73.1 | 80 |
| 9 lbs. | 79.2 | 53.9 | 70 | 84.3 | 70.0 | 80 |

This table shows the superiority in practical application of calcium carbonate prepared according to the method of this invention over calcium carbonate prepared by the gel-forming method. This superiority is reflected in higher gloss values and in higher printability values.

EXAMPLE IV

This example illustrates the necessity for the gradual precipitation of the calcium carbonate while applying anti-compositing forces to the precipitated crystals.

4.9 liters of ammonium carbonate solution at 35° C. and with an ammonium carbonate concentration of 205 grams per liter were added all at once to 9.83 liters of DBO liquor (a solution of calcium chloride at a concentration of 110 grams per liter of calcium chloride) at a temperature of 49° C. in a reactor tank while agitating the mixture with a fan bladed turbine agitator rotating at a speed of 1500 r.p.m. In another reactor tank 29.4 liters of the ammonium carbonate solution were added all at once to 59 liters of the DBO liquor while using an anti-compositing force producing apparatus of the type shown in the drawings. In the latter case the outside diameter of the inner disc was 4.6 inches, the ratio of the inside diameter of the reactor tank to the outside diameter of the inner disc was less than 6:1, the apparatus was operated with a pumping ratio of at least 3:1 and at a speed of 3200 r.p.m. or a peripheral speed of 3680 feet per minute, and the head of the apparatus was submerged in the DBO liquor to a depth such that after addition of the ammonium carbonate solution it was submerged to a depth of about ⅓ the depth of the contents of the reactor tank.

In both cases, as reaction and precipitation took place a gel was formed, which gel broke up in 60 to 90 seconds under the influence of the agitation and of the anti-compositing forces. After 10 minutes of agitation and of subjection to the anti-compositing forces the calcium carbonate precipitate in each instance was removed from the mother liquor by filtration, washed, dried at 105° C. to less than 2% by weight of moisture, and then hammermilled. Samples of the products gave the following tabulated data:

|  | Calcium Carbonate Prepared with Anti-Compositing Forces Producing Apparatus | Calcium Carbonate Prepared with Turbine Agitator |
|---|---|---|
| Packed Density_____g./cc__ | 0.85 | 0.76 |
| Apparent Particle Size Distribution: |  |  |
| Greater than 10μ_____percent by wt__ | 16 | 11 |
| From 10μ to 6μ_____do____ | 54 | 66 |
| From 6μ to 4μ_____do____ | 20 | 16 |
| From 4μ to 2μ_____do____ | 8 | 6 |
| From 2μ to 1μ_____do____ | 1 | 1 |
| Less than 1μ_____do____ | 1 | 0 |
| Gloss (Procedure B) Hunter 75°_____ | 19 | 30 |

Electron microscope photographs of samples show the crystals in each case to be composited, thus confirming the indications of the measurements.

EXAMPLE V

This example further illustrates the necessity of gradually precipitating the calcium carbonate.

The same equipment and the same operating conditions were used and observed here as in Example IV except that in the first case 4.7 liters of DO liquor (180 grams per liter of $Na_2CO_3$ and 50 grams per liter of $NaHCO_3$) at 35° C. were added all at once to 9.83 liters of DBO liquor (112 grams per liter of $CaCl_2$) at 49° C. while in the second case 28 liters of the DO liquor were added all at once to 59 liters of the DBO liquor. In each case a heavy gel formed, which broke up in 60–90 seconds. After 10 minutes of agitation and of subjection to anti-compositing forces, the precipitated calcium carbonate in each case was filtered from its mother liquor, washed, dried at 105° C. to less than 2% by weight of moisture and then hammermilled.

For purposes of comparison a calcium carbonate sample prepared without gel formation but otherwise under equivalent conditions in accordance with this invention and along the lines of Example II was obtained. Data obtained on samples of the three calcium carbonate products are tabulated as follows:

|  | Calcium Carbonate Prepared According To Invention | Calcium Carbonate Prepared With Anti-Compositing Forces Producing Apparatus With Gel Formation | Calcium Carbonate Prepared With Turbine Agitation With Gel Formation |
|---|---|---|---|
| Packed Density_____grams/cc__ | 0.65 | 1.0 | 1.1 |
| Particle Size Distribution: |  |  |  |
| Greater than 10μ_____percent by wt__ | 0 | 62 | 48 |
| From 10μ to 6μ_____do____ | 1 | 24 | 42 |
| From 6μ to 4μ_____do____ | 6 | 9 | 6 |
| From 4μ to 2μ_____do____ | 35 | 4 | 1 |
| From 2μ to 1μ_____do____ | 46 | 1 | 2 |
| Less than 1μ_____do____ | 12 | 0 | 1 |
| Gloss (Procedure B) Hunter 75°_____ | 37 | 12 | 8 |

The foregoing data indicate that calcium carbonate prepared with gel formation regardless of whether or not anti-compositing forces of sufficient intensity and magnitude are present is composited as compared to calcium carbonate prepared without gel formation and with the use of anti-compositing forces of sufficient intensity and magnitude. Electron microscope photographs of each sample confirm this.

Measurement procedures (1) *15 min. settled volume at 60 g.p.l. (ml.).*—The suspended solids concentration of a sample of reaction slurry is adjusted by dilution or decantation to 60 grams per liter. 1000 milliliters of the adjusted slurry, at a temperature of 70° F., are then added to a one liter graduate cylinder and thoroughly agitated and mixed in the graduate. As soon as the turbulence of the mixing stops, the time is noted and fifteen minutes later the volume of the pulp in the cylinder is ascertained either by direct reading or by noting the volume of the overlying clear liquor and subtracting from 1000. This value in milliliters is indirectly proportional to the average, apparent particle size of the solids.

(2) *Packed density (g./cc.).*—This value is ascertained by the procedure and with the apparatus set forth in Analytical Chemistry, vol. 24, page 1869 (November 1952). It is directly proportional to the apparent (or gross) particle size of the solids (as distinguished from the ultimate particle size).

(3) *Apparent particle size distribution.*—This data was obtained by the Andreasen pipette technique. This procedure is carried out as follows: Slurry up in 500 milliliters of distilled water 0.3 gram of dry calcium carbonate with 1% by weight (based on the dry calcium carbonate) of dispersant (sodium polyphosphate) in a malted milk mixer for 10 minutes. Add the slurry thus formed to a 500 ml. graduated cylinder and allow the suspension to come to quiescence. Then, pipette 5 mil samples at a liquid depth of 5 centimeters at settling time intervals as calculated by Stokes law for given particle sizes, dry the pipetted samples and weigh. This method is specifically described in Ber. Deut. Keram. Gesell. 11, 249–62 (1930).

(4) *Gloss.*—Procedure A: Gloss values were obtained by preparing a paper coating formulation consisting of 20 parts calcium carbonate, 80 parts No. 1 coating clay with 10 parts starch and 5 parts styrene-butadiene latex based on the total pigment content as adhesive. A 10-pound/ream/side coat weight was applied to a pre-sized rawstock. The coated paper was supered by passing it six times through an Appleton laboratory calender using a single nip at each pass. Gloss values of the coated sheet were then determined in accordance with standard gloss measuring techniques, TAPPI T480m-51 (Hunter 75°) and TAPPI T424m-52 (Ingersol 60°).

Procedure B: Gloss values under this procedure were obtained by preparing a paper coating formulation consisting of 50 parts calcium carbonate, 50 parts No. 2 coating clay and 15 parts casein coating formulation used by me as a standard formulation. The coating was applied as a 45% by weight solids suspension in water to a pre-sized, 40-pound basis weight (25 x 38—500), stock at the rate of 12 pounds/ream/side. The coated paper was supered by passing it six times through an Appleton laboratory calender using a single nip at each pass. Gloss values of the coated sheet were then determined by the standard gloss measuring technique set forth under Procedure A.

(5) *Printability*.—Uniformly adopted methods and standards have not as yet been established. Consequently, the method and standard used were private and not made available for publication. However, in general, it is a measure of the ability of the coating to receive ink printing. In this instance, the data reported were from tests made on a comparative basis.

What is claimed is:

1. A process for preparing a finely divided, precipitated calcium carbonate, which comprises contacting calcium ions and carbonate ions in a precipitation zone and simultaneously imparting to the calcium carbonate slurry being formed within said zone high shear, intense turbulence and a linear velocity of at least about 1160 feet per minute, whereby a finely divided, uncomposited calcium carbonate precipitate is obtained.

2. A process in accordance with claim 1 wherein said precipitation zone is maintained at a pH of at least about 8.5.

3. A process in accordance with claim 1 wherein said calcium carbonate slurry is maintained within said precipitation zone until precipitation is substantially completed.

4. A process for preparing a finely divided, precipitated calcium carbonate, which comprises contacting calcium ions and carbonate ions in a field of anti-compositing forces disposed within an aqueous precipitation zone so as to form a calcium carbonate slurry, said anti-compositing forces imparting high shear, intense turbulence and a linear velocity of at least about 1160 feet per minute to the slurry in said field, whereby a finely divided, uncomposited calcium carbonate precipitate is obtained.

5. A process in accordance with claim 4 wherein said precipitation zone is maintained at a pH of at least about 8.5.

6. A process for preparing a finely divided, precipitated calcium carbonate, which comprises passing calcium ions and carbonate ions through a field of anti-compositing forces disposed within an aqueous precipitation zone and simultaneously contacting said ions so as to form a slurry of precipitated calcium carbonate, said anti-compositing forces imparting high shear, intense turbulence and a linear velocity of at least about 1160 feet per minute to the slurry in said field and continuously recycling the slurry through said field until precipitation is substantially completed, whereby a finely divided, uncomposited calcium carbonate precipitate is obtained.

7. A process in accordance with claim 6 wherein said precipitation zone is maintained at a pH of at least about 8.5 and at a temperature in the range from about 25° to about 60° C.

8. A process according to claim 7 wherein said calcium ions are furnished by milk of lime.

9. A process according to claim 7 wherein said calcium ions are supplied by calcium chloride.

10. A process according to claim 7 wherein said carbonate ions are furnished by carbon dioxide.

11. A process according to claim 7 wherein said carbonate ions are furnished by sodium carbonate.

12. A process for preparing a finely divided, precipitated calcium carbonate, which comprises passing an aqueous solution of sodium carbonate through a field of anti-compositing forces disposed within an aqueous precipitation zone containing calcium chloride, and simultaneously contacting calcium ions and carbonate ions in said field so as to form a slurry of calcium carbonate, said anti-compositing forces imparting (1) high shear, intense turbulence and a linear velocity of at least about 1160 feet per minute to the slurry in said field and (2) a helical-type flow pattern to the slurry in said aqueous precipitation zone, whereby a finely divided, uncomposited calcium carbonate precipitate is obtained.

13. A process for precipitating a finely divided precipitated calcium carbonate which comprises passing an aqueous solution of sodium carbonate through a field of anti-compositing forces disposed within an aqueous precipitation zone containing calcium chloride, and simultaneously contacting calcium ions and carbonate ions in said field so as to form a slurry of calcium carbonate, said anti-compositing forces imparting (1) high shear, intense turbulence and a linear velocity of at least about 1160 feet per minute to the slurry in said field and (2) a helical-type flow pattern to the slurry in said aqueous precipitation zone and continually recycling said calcium carbonate slurry through said field until precipitation is substantially completed, whereby a finely divided, uncomposited calcium carbonate precipitate is obtained.

14. A process in accordance with claim 13 wherein said precipitation zone is maintained at a pH of at least about 8.5 and at a temperature in the range of about 25°–60° C.

References Cited in the file of this patent
UNITED STATES PATENTS

| | | |
|---|---|---|
| 2,140,375 | Allen et al. | Dec. 13, 1938 |
| 2,182,096 | Roderick | Dec. 5, 1939 |
| 2,619,330 | Willems | Nov. 25, 1952 |

OTHER REFERENCES

Thorpe's Dictionary of Applied Chemistry, Fourth Edition, vol. 2, 1938, pages 220, 221.